May 5, 1959      Q. A. KERNS      2,885,496

LOW-LEVEL DIRECT CURRENT AMPLIFIER

Filed April 20, 1954

INVENTOR.
QUENTIN A. KERNS
BY
ATTORNEY.

United States Patent Office 2,885,496
Patented May 5, 1959

2,885,496
LOW-LEVEL DIRECT CURRENT AMPLIFIER

Quentin A. Kerns, Berkeley, Calif., assignor to the United States of America as represented by the United States Atomic Energy Commission Application April 20, 1954, Serial No. 424,535

2 Claims. (Cl. 179—171)

The present invention relates to a low-level direct current modulator and more particularly to apparatus for amplifying direct current signals.

Often times in the electrical art it is desired to amplify direct current signals of small value with greater accuracy than is possible with known principles. To accomplish such result in a simple manner, two parallel circuits including alternating current power supplies and a plurality of devices having symmetrical nonlinear impedance characteristics are interconnected to be responsive to direct current signals and to produce an output voltage which is proportional to such signals.

It is therefore an object of the invention to provide a new and improved direct current amplifier.

Another object of the invention is to provide modulation between a direct current signal and an alternating current to provide an amplified output signal which is proportional to the direct current signal.

A further object of the invention is to provide a simple direct current amplifier of high sensitivity to low values of input signal and of high accuracy.

Still another object of the invention is to provide a direct current amplifier wherein alternating voltages are balanced for odd harmonics across symmetrical and nonlinear impedances and unbalanced for even harmonics.

Other objects and advantages will be apparent in the following description and claims considered together with the accompanying drawing, in which:

Figure 1:
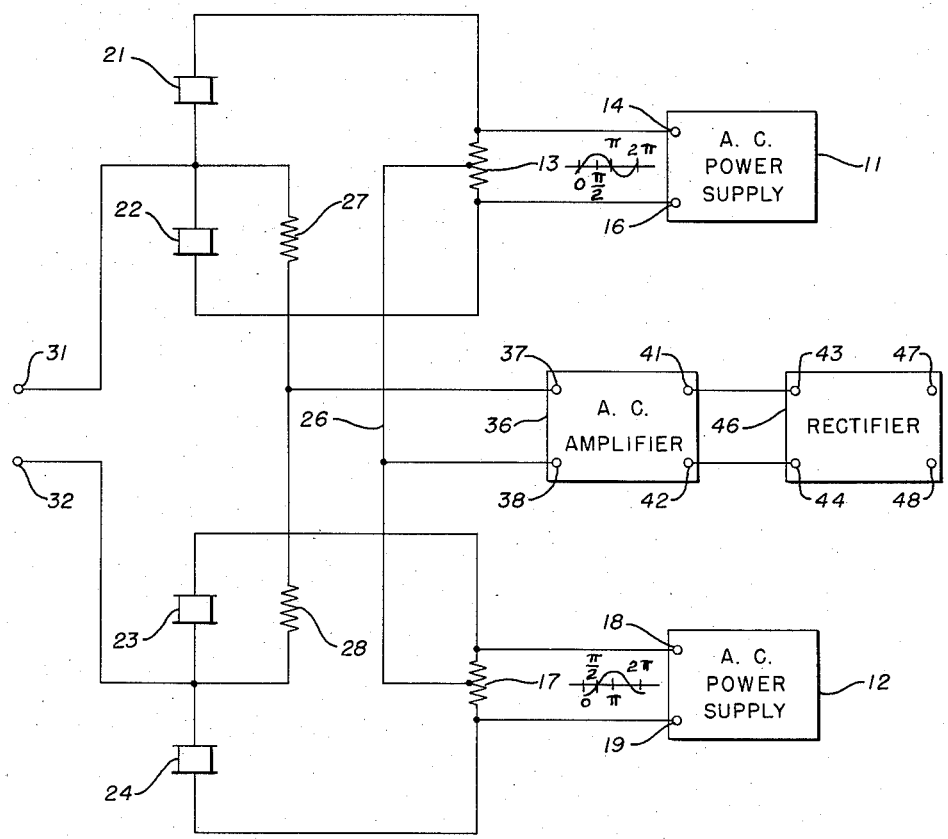
Figure 1 is a schematic diagram of the invention.

Referring to the drawing in detail, it will be noted that there is provided a first alternating current power supply 11 and a second alternating current power supply 12. Such power supplies 11 and 12 are conventional and have equal sine wave output voltages which are established to have the same frequency with a ninety degree phase difference. A center-tapped resistor 13 is connected between output terminals 14 and 16 of the first power supply 11. Similarly a center-tapped resistor 17 is connected between output terminals 18 and 19 of the second power supply 12. Thus the voltages developed by the power supplies 11 and 12 appear across the resistors 13 and 17, respectively. While the power supplies 11 and 12 have been illustrated in the drawing and described above in block form as conventional electronic devices developing alternating voltages, alternators having center-tapped windings could be used with equal results.

Two series-connected nonlinear impedances 21 and 22, having symmetrical characteristics, are connected in parallel with the resistor 13 at the output of the first power supply 11. Similarly, two series-connected nonlinear impedances 23 and 24, also having symmetrical characteristics, are connected in parallel with the resistor 17 at the output of the second power supply 12. Such nonlinear impedances 21–24 are selected to have substantially identical characteristics and may be similar disks of Thyrite, a silicon-carbide ceramic material. The desirable current-voltage characteristic of the nonlinear impedances 21–24 is illustrated by the solid line curve 25 of Fig. 2 of the drawing. Thus there are provided two identical parallel circuits, one of which operates at a voltage ninety degrees out of phase with the other.

In accordance with the invention the center taps of the resistors 13 and 17 are directly connected together by a lead 26 and the junctions between each pair of nonlinear impedances 21–24 are connected by two similar series-connected resistors 27 and 28. A pair of terminals 31 and 32 are provided for ease of connection to a source (not shown) of direct current signals with one terminal 31 connected to the junction between one pair of nonlinear impedances 21 and 22 and with the other terminal 32 connected to the junction between the other pair of nonlinear impedances 23 and 24.

A conventional alternating current amplifier 36 is provided and input terminals 37 and 38 thereof are respectively connected to the junction of the two resistors 27 and 28 between the pairs of nonlinear impedances 21 and 24 and to the lead 26 between the center taps of the resistors 13 and 17. Output terminals 41 and 42 of the amplifier 36 are respectively connected to input terminals 43 and 44 of a conventional rectifier 46. The output of such rectifier 46 appears across output terminals 47 and 48 which serve as the output for the circuit.

Consider, now, the foregoing circuit with the power supplies 11 and 12 suitably energized to develop output voltages of equal value at the same frequency, but with a ninety degree phase difference. With no direct current signal impressed between the terminals 31 and 32, the only current flowing through the nonlinear impedances 21–24 will be due to the power supplies 11 and 12. Since the impedance characteristic of the nonlinear impedances 21–24 is symmetrical, there will be only voltages having odd harmonic frequencies in the circuits. Such symmetry is illustrated by the solid line curve 25 of Fig. 2, wherein it is seen that a negative voltage will result in a negative current having the same absolute value as a positive current flowing because of a positive voltage having the same absolute value as the negative voltage.

Under the foregoing conditions, the voltage of the first power supply 11 at the fundamental frequency appears across the center-tapped resistor 13 with the terminals 14 and 16 being 180 degrees out of phase. Thus the voltage of the center tap of the resistor 13 assumes a value midway between the terminals 14 and 16. Since the two nonlinear impedances 21 and 22 are series-connected across the resistor 13, the voltages thereacross are in the same direction. It will then be seen that the junction between the two nonlinear impedances 21 and 22 is at the same voltage as the center tap of the resistor 13.

A similar consideration of the second power supply 12 and nonlinear impedances 23 and 24 results in the determination that the junction between the impedances 23 and 24 is at the same voltage as the center tap of the resistor 17. Now, since the two systems are interconnected by the lead 26 and the two resistors 27 and 28, it will be readily apparent that there will be no voltage difference between the lead and the junction of the resistors. Such result occurs for all voltages having odd harmonic frequencies (third, fifth, seventh, etc.), as well as the fundamental frequency.

If a direct current signal, having a constant value, is applied between the terminals 31 and 32, current flows through one set of the nonlinear impedances 21, 22 in one direction and through the other set of impedances 23, 24 in the opposite direction. The flow of direct current through the nonlinear impedances 21–24 provides a bias which shifts the current axis, about which alternating components operate, to one side or the other of the unbiased axis (see Fig. 2 wherein the current axis 51 is illustrated as shifted to one side of the zero bias axis 52 by an amount equal to the value of impressed bias). Such shift of the current axis from the zero axis 52 does not disturb the characteristic of the nonlinear impedances 21–24, but does alter the manner in which the circuits including the nonlinear impedances respond to alternating components; i.e., the response is no longer symmetrical to the alternating components. It is well known that, where a nonlinear impedance in an alternating current circuit is not symmetrical, even harmonic components are developed.

At this point it is to be noted that both of the parallel circuits are balanced as to the points of interconnection therebetween which results in no difference in voltage between the lead 26 and the junction between the resistors 27 and 28 due to the direct current bias applied at the terminals 31 and 32. Also, any odd harmonic components due to the alternating current are balanced out in accordance with the foregoing.

Now consider the first of the voltage components having an even harmonic frequency (i.e., second harmonic) in the circuit. As stated previously, the direct current flow will be opposite through the respective pairs of nonlinear impedances 21–24; i.e., the flow will be toward the first power supply 11 through the impedances 21 and 22 and away from the second power supply 12 through the impedances 23 and 24 for one polarity of bias at the terminals 31 and 32. In the branch of the circuit including the two nonlinear impedances 21 and 22 and the first power supply 11, a second harmonic frequency voltage will appear between the junction of the impedances and the center tap of the resistor 13. In the other branch of the circuit including the two nonlinear impedances 23 and 24 and the second power supply 12, a second harmonic frequency voltage will also appear between the junction of the two impedances and the center tap of the resistor 17. If the voltage output of the first power supply 11 is in phase with that of the second power supply 12, the respective and above-referenced voltages of second harmonic frequency will be 180 degrees out of phase because of the difference in the bias applied to the nonlinear impedances 21–24. As has been stated, however, the voltage at the fundamental frequency of the second power supply 12 has been established to be 90 degrees out of phase with the voltage of the first power supply 11 with the result that the second harmonic frequency components are 180 degrees out of phase. Thus the second harmonic frequency voltage appearing between the junction of the second two nonlinear impedances 23 and 24 and the center tap of the resistor 17 will be in phase with the second harmonic frequency voltage appearing between the first two nonlinear impedances 21 and 22 and the center tap of the resistor 13. Since the center taps of the resistors 13 and 17 are connected together by the lead 26 and the junctions between the pairs of impedances 21–24 are connected by the two equal resistors 27 and 28, a voltage having the second harmonic frequency appears between the junction of the latter resistors and the lead 26. Such voltage is coupled to the input of the amplifier 36, the output of which is rectified by the rectifier 46.

The unidirectional voltage at the output terminals 47 and 48 of the rectifier 46 is proportional to the voltage having the second harmonic frequency as developed in the circuit. The value of the votage having the second harmonic frequency is proportional to the direct current bias applied to the nonlinear impedances 21–24. Thus by suitable selection of the nonlinear impedances 21–24 a small change in the direct current bias at the terminals 31 and 32 will result in a larger change in the second harmonic frequency voltage developed and in a larger proportional change in the unidirectional voltage output of the rectifier 46.

It will be readily apparent that the same discussion as set forth for the voltages of second harmonic frequency applies equally for other voltages of even harmonic frequency. The amplifier 36 may therefore include a filter section (not shown) to pass only the voltage of second harmonic frequency which is the larger of the components having even harmonic frequencies.

Figure 2:
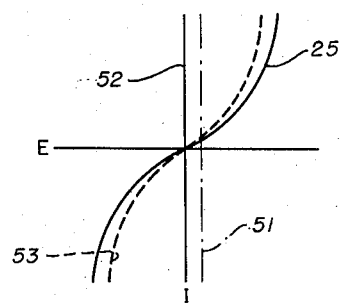
Figure 2 is a characteristic curve of nonlinear impedances of Fig. 1.

The dotted line 53 of Fig. 2 represents the effect of temperature changes upon the current-voltage characteristic of the nonlinear impedances 21–24, and it will be noted that the symmetry of such characteristic is not disturbed. While the impedance at certain values of current and voltage is altered by a temperature change, the circuit still operates in the manner set forth in the foregoing without any serious effect.

It is to be noted that high frequency output voltages of the power supplies 11 and 12 are preferable in that the more often alternating voltages are compared with the direct current signal, the more accurately the circuit will operate. Thus the degree of accuracy desired establishes the frequency of the modulating voltages to be used.

While the salient features of the invention have been described in detail with respect to one embodiment it will be apparent that numerous modifications may be made within the spirit and scope of the invention, and it is therefore not desired to limit the invention to the exact details shown except insofar as they may be defined in the following claims.

What is claimed is:

1. A low-level direct current modulator comprising a first alternating current power supply having a first center-tapped resistor connected between output terminals thereof, a first pair of nonlinear impedances series-connected across said first center-tapped resistor, a second alternating current power supply having a second center-tapped resistor connected between output terminals thereof, a second pair of nonlinear impedances series-connected across said second center-tapped resistor, said nonlinear impedances selected to have symmetrical and substantially identical current-voltage characteristics, said power supplies having output voltages of substantially equal value and frequency with one ninety degrees out of phase with the other, the center taps of said first and second center-tapped resistors being connected together, two equal and series-connected resistors connected between the junctions of said first and second pairs of nonlinear impedances, and means for connecting a direct current signal between the junctions of said nonlinear impedances whereby a voltage having even harmonic frequencies of the frequency of said power supplies and being proportional to said direct current signal is developed between the junction of said two series-connected resistors and the center taps of said center-tapped resistors.

2. A direct current amplifier comprising a first alternating current power supply having a first impedance connected between output terminals thereof, a first pair of nonlinear impedances series-connected across said first impedance, a second alternating current supply having a second impedance connected between output terminals thereof, a second pair of nonlinear impedances series-connected across said second impedance, said nonlinear impedances having symmetrical and similar current-voltage characteristics, one of said power supplies having an output voltage ninety degrees out-of-phase with the other, a center tap of said first impedance directly connected to a center tap of said second impedance, two equal value resistors connected in series between the common connection of said first and second pairs of nonlinear impedances, terminal means connected to the common connection of said first and second pairs of nonlinear impedances for connection of a direct current signal, an alternating current amplifier having an input connected between said center taps and the common connection of said two resistors, and a rectifier connected to an output of said amplifier.

References Cited in the file of this patent
UNITED STATES PATENTS

| | | |
|---|---|---|
| 2,020,409 | Green | Nov. 12, 1935 |
| 2,440,465 | Ferguson | Apr. 27, 1948 |
| 2,459,104 | Gilbert | Jan. 11, 1949 |
| 2,470,893 | Hepp | May 24, 1949 |
| 2,503,039 | Glass | Apr. 4, 1950 |